US009225410B2

(12) United States Patent  
He et al.

(10) Patent No.: US 9,225,410 B2  
(45) Date of Patent: *Dec. 29, 2015

(54) COMMUNICATION SYSTEM, APPARATUS AND METHOD

(71) Applicant: HUAWEI TECHNOLOGIES CO., LTD., Shenzhen (CN)

(72) Inventors: Yong He, Berkshire (GB); Hui Ni, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,760

(22) Filed: Jun. 10, 2014

(65) Prior Publication Data

US 2014/0287798 A1 Sep. 25, 2014

Related U.S. Application Data

(63) Continuation of application No. 13/929,000, filed on Jun. 27, 2013, now Pat. No. 8,768,416, which is a continuation of application No. 13/094,120, filed on Apr. 26, 2011, now Pat. No. 8,498,659, which is a continuation of application No. PCT/CN2009/074618, filed on Oct. 26, 2009.

(30) Foreign Application Priority Data

Oct. 27, 2008 (CN) .......................... 2008 1 0171577  
Nov. 14, 2008 (CN) .......................... 2008 1 0176220

(51) Int. Cl.
*H04M 1/00* (2006.01)  
*H04B 7/04* (2006.01)

(Continued)

(52) U.S. Cl.
CPC ................ *H04B 7/0495* (2013.01); *H04B 1/74* (2013.01); *H04B 7/0491* (2013.01); *H04W 88/08* (2013.01); *H04B 7/06* (2013.01)

(58) Field of Classification Search
CPC ....... H04B 7/0491; H04B 7/0495; H04B 7/06  
USPC ........... 455/561, 507, 560, 550.1, 575.1, 445, 455/552.1, 553.1, 90.3, 422.1, 40, 3, 42, 455/6.1, 426.2, 508, 500, 51, 7, 515; 370/310, 328, 329, 338, 343  
See application file for complete search history.

(56) References Cited

U.S. PATENT DOCUMENTS 7,047,028 B2 5/2006 Cagenius  
2001/0041595 A1 11/2001 Ikeda et al.

(Continued)

FOREIGN PATENT DOCUMENTS

CN 1372726 A 10/2002  
CN 1777303 5/2006

(Continued)

OTHER PUBLICATIONS

First Chinese Office Action mailed Sep. 11, 2009, issued in corresponding Chinese Patent Application No. 200810176220.4.

(Continued)

*Primary Examiner* — Keith Ferguson  
(74) *Attorney, Agent, or Firm* — Staas & Halsey LLP

(57) ABSTRACT

A communication system, apparatus and method are provided according to embodiments of the present invention. The communication system includes: a base band unit (BBU), at least two antennas and at least two radio-frequency (RF) units, where the at least two RF units are connected with the BBU respectively; and each of the antennas is connected with at least two RF units respectively, so that a signal received from a same sector by an antenna is sent to the BBU via different RF units. With the embodiments of the present invention, the reliability of RF units may be improved without increasing the hardware cost of the base station.

11 Claims, 7 Drawing Sheets

(51) Int. Cl.
*H04B 1/74* (2006.01)
*H04W 88/08* (2009.01)
*H04B 7/06* (2006.01)

(56) References Cited

U.S. PATENT DOCUMENTS

| | | |
|---|---|---|
| 2004/0121776 A1 | 6/2004 | Kim |
| 2008/0214124 A1 | 9/2008 | Saitou et al. |
| 2010/0016021 A1 | 1/2010 | Xu et al. |
| 2013/0288752 A1 | 10/2013 | He |

FOREIGN PATENT DOCUMENTS

| | | | |
|---|---|---|---|
| CN | 101179315 | | 5/2008 |
| CN | 101277484 | | 10/2008 |
| CN | 101291168 A | * | 10/2008 |
| CN | 101426303 | | 5/2009 |
| EP | 0596727 | | 5/1994 |
| EP | 1199816 A1 | | 4/2002 |
| EP | 1534027 | | 5/2005 |
| EP | 1534027 A2 | | 5/2005 |
| EP | 1713290 | | 10/2006 |
| EP | 1833270 | | 9/2007 |
| EP | 1841159 A2 | | 10/2007 |

OTHER PUBLICATIONS

Written Opinion of the International Search Authority mailed Jan. 28, 2010, issued in corresponding International Patent Application No. PCT/CN2009/074618.
Extended European Search Report dated May 29, 2012, issued in corresponding European Patent Application No. 09823063.4.
International Search Report, mailed Jan. 28, 2010, in corresponding International Application No. PCT/CN2009/074618 (5 pages).
U.S. Office Action mailed Oct. 23, 2012 in co-pending U.S. Appl. No. 13/094,120 (17 pages).
U.S. Notice of Allowance mailed Mar. 27, 2013 in co-pending U.S. Appl. No. 13/094,120 (6 pages).
U.S. Notice of Allowance mailed Mar. 11, 2014 in co-pending U.S. Appl. No. 13/929,000 (10 pages).
U.S. Office Action dated Oct. 10, 2013 in co-pending U.S. Appl. No. 13.929,000 (11 pages).
European Office Action mailed Sep. 5, 2013 in corresponding European Application No. 09823063.4-1855 (6 pages).
Chinese Office Action dated Dec. 4, 2013 in corresponding Chinese Patent Application No. 201210042413.7 (6 pages).
Extended European Search Report dated Sep. 9, 2014 in related European Patent Application No. 14172994.7 (7 pages).
PCT International Search Report (Form PCT/ISA/210) and PCT ISA Written Opinion (Form PCT/ISA/237) dated Jan. 28, 2010 in corresponding International Patent Application No. PCT/CN2009/074618 (13 pages) (7 pages English Translation).

* cited by examiner

COMMUNICATION SYSTEM, APPARATUS AND METHOD

CROSS-REFERENCE TO RELATED APPLICATIONS

This application is a continuation of U.S. patent application Ser. No. 13/929,000, filed on Jun. 27, 2013, which is a continuation of U.S. patent application Ser. No. 13/094,120, filed on Apr. 26, 2011, which is a continuation of International Application No. PCT/CN2009/074618, filed on Oct. 26, 2009, which claims priority to Chinese Patent Application No 200810176220.4, filed on Nov. 14, 2008 and Chinese Patent Application No. 200810171577.3, filed on Oct. 27, 2008, all of which are hereby incorporated by reference in their entireties.

FIELD OF THE INVENTION

The present invention relates to the field of communication technologies, and more specifically, to a communication system, apparatus and method.

BACKGROUND

The architecture of a base station mainly includes a base band signal processing unit, a radio-frequency (RF) unit, a master transmission clock, a power supply, a fan and some peripheral circuits. FIG. 1A is a schematic diagram of the architecture of a base station in the conventional art. As shown in FIG. 1A, except for the radio-frequency units, the other parts may be physically integrated into a Base Band Unit (BBU). The radio-frequency unit may either be installed together with the base band unit in a cabinet, or may be a Remote Radio Unit (RRU) remotely connected via a medium such as a cable or optical fiber. FIG. 1B is a schematic diagram of a distributed base station architecture in prior art. As shown in FIG. 1B, the BBU here may be connected with an RRU via a Common Public Radio Interface (CPRI).

The RF unit mainly includes a digital intermediate frequency module, an analog-to-digital/digital-to-analog (AD/DA) conversion module, a radio-frequency transceiving channel, a power amplification module, a duplexer, a power supply, etc. The up-conversion technology is employed in a downlink transmitting channel of the RF unit to modulate signals to an RF transmitting band, where the signals are filtered, amplified or combined, and then sent by a duplex filter to an antenna for transmission to a wireless terminal. In an uplink receiving channel, RF signals are received via an antenna, and the received signals are down-converted to intermediate frequency signals, which then undergo amplification, analog-to-digital conversion, digital down-conversion, matching and filtering, and Automatic Gain Control (AGC), and are sent via an interface (e.g., a CPRI interface if the RF unit is an RRU) to the BBU for processing.

The BBU mainly performs base band signal processing, where the signal processing includes modulation, demodulation, L2/L3 control, transmission, operation maintenance, etc. The BBU is connected with a transmission network via a transmission interface, e.g., E1/T1, Ethernet interface, and is connected with a base station controller, a core network, or other network elements.

To improve reliability, at least two assembled RF units are usually employed for a single sector in the conventional art. FIG. 2 illustrates a schematic diagram where two assembled RF units are used for a single sector to improve reliability. In this way, if any one of the RF units of the sector fails, it may only result in the decrease of capacity and performance of the sector rather than the interrupt of service.

In implementing the present invention, it is discovered that the solution of the conventional art encounters the problem of high cost since at least one extra RF unit is required.

SUMMARY

Embodiments of the present invention provide a communication system, apparatus and method, in order to improve the reliability of service while reducing the hardware cost.

A communication system is provided according to an aspect of the present invention. The communication system includes: a base band unit (BBU), at least two antennas and at least two radio-frequency (RF) units, where the at least two RF units are connected with the BBU respectively; and each antenna of the at least two antennas is connected with at least two RF units respectively, so that a signal received from a same sector by the antenna is sent to the BBU via different RF units.

A base band unit (BBU) is also provided according to an aspect of the present invention. The BBU includes: at least two base band processing units, and a cross-connection matrix, where each of the at least two base band processing units are configured to process signals of a same sector which are received from different radio-frequency (RF) units; and the cross-connection matrix is connected with the at least two base band processing units and is configured to interchange signals between the at least two base band processing units.

A communication method is also provided according to an aspect of the present invention. The communication method is applicable in a system which includes a base band unit (BBU), at least two antennas and at least two radio-frequency (RF) units, where the at least two RF units are connected with the BBU respectively, and each of the antennas is connected with at least two RF units respectively, and the communication method includes:

receiving, by the BBU, signals from different antennas, where a signal received from a same sector by one of the antennas is sent to the BBU respectively via different RF units; and processing, by the BBU, the signals.

Compared with the conventional art, the embodiments of the present invention have the following advantages.

According to the aspects of the present invention, by cross-connections of the channel of the RF units with the feeder lines of the antennas, the service data for a single sector is distributively processed via the channels of different RF units by virtue of the independence of at least two transceiving channels. This may improve the reliability of the base station since the failure of a single RF unit will not result in service interruption of the whole sector. By the reliability estimation, the reliability of the RF units may be improved without increasing the hardware cost of the base station.

DETAILED DESCRIPTION

Figure 1A:
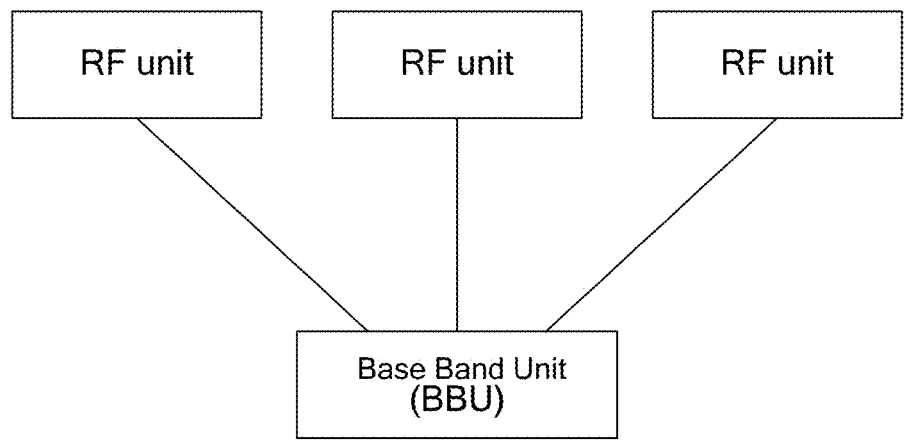
FIG. 1A is a schematic diagram of a base station architecture in the conventional art.
Figure 1B:
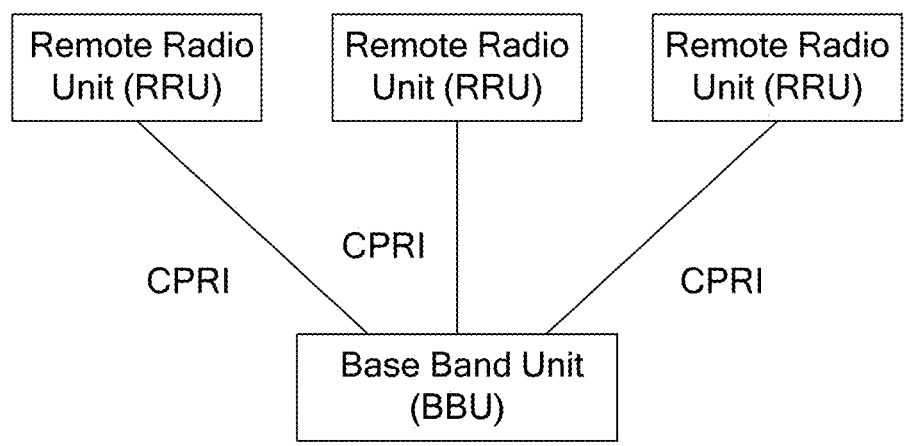
FIG. 1B is a schematic diagram of a distributed base station architecture in the conventional art.
Figure 2:
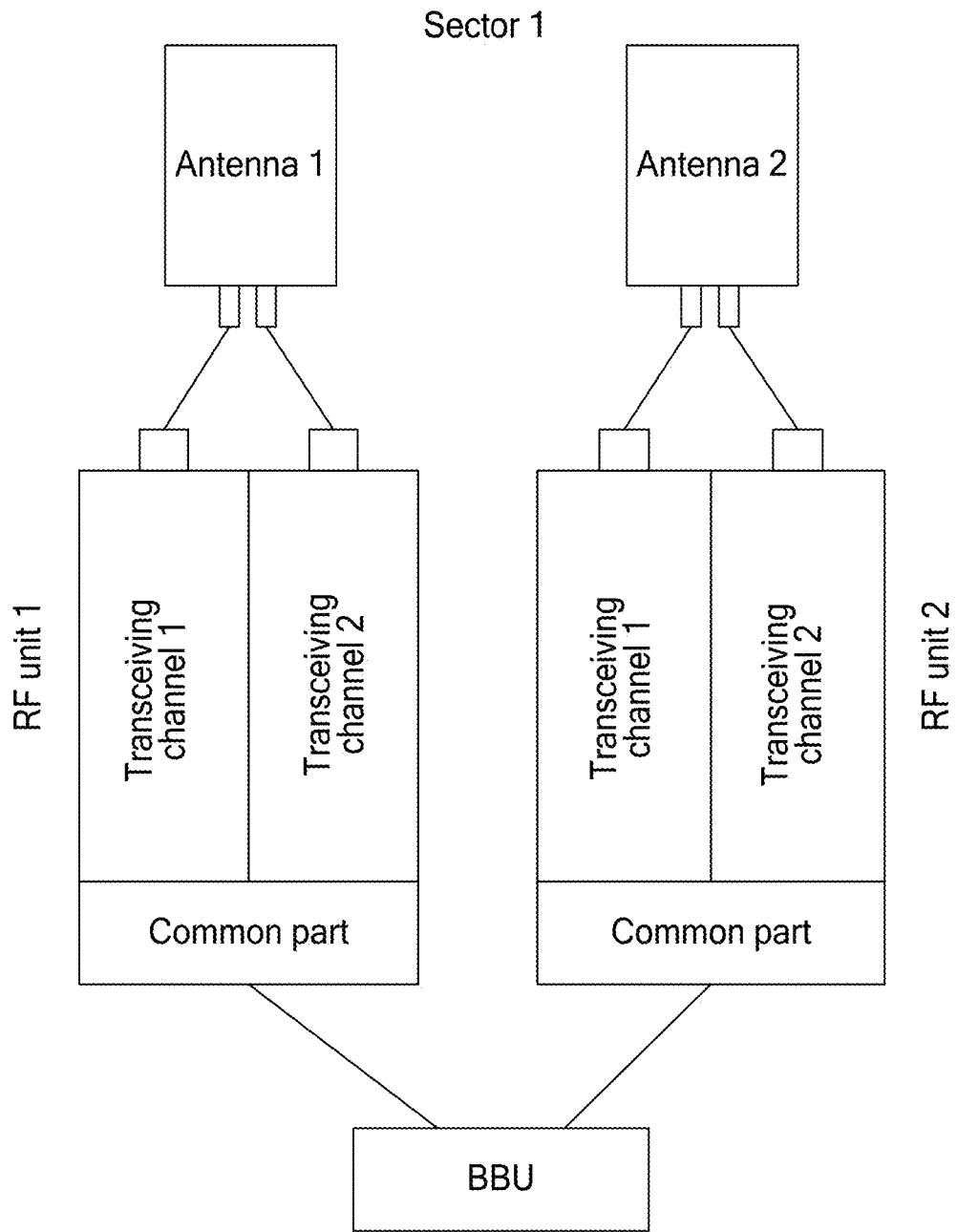
FIG. 2 is a schematic diagram where two assembled RF units are used for a single sector in the conventional art.

The purposes, features and advantages concerning the present invention will become more readily appreciated with reference to the following description of the embodiments, when taken in conjunction with the accompanying drawings.

A communication system is provided according to an embodiment of the present invention. The communication system includes: a base band unit (BBU), at least two antennas and at least two radio-frequency (RF) units, where each antenna is connected with at least two RF units, respectively. Specifically, at least two feeder lines of each antenna are connected with transceiving channels of at least two different RF units respectively, so that a signal received from the same sector by each antenna could, via different RF units, be sent to the BBU. In addition, all the RF units are connected with the BBU.

The BBU of the communication system includes at least two base band processing unit, each of which further includes a forwarding subunit and a base band signal processing subunit.

Specifically, the forwarding subunit is configured to: in the uplink receiving direction, aggregate the signals of a same sector which are received from different RF units, and transfer the aggregated signals to a same base band signal processing subunit for processing; in the downlink transmitting direction, distribute base band data of the same sector, where the base band data of the same sector is processed by the base band signal processing subunit, to the corresponding RF units which then send the signals to the corresponding sector via cross-connected feeder lines.

Specifically, the base band signal processing subunit is configured to: process the received signals of a same sector, and send the processed base band data of the same sector to the forwarding subunit.

In addition, the BBU may further include a cross-connection matrix, which is connected with each of the base band processing units and is configured to mutually transmit interaction signals among the base band processing units.

According to an embodiment of the present invention, by cross-connections of the channels of the RF units with the feeder lines of the antennas, the service data for a single sector is distributively processed via the channels of different RF units by virtue of the independence of at least two transceiving channels. This may improve the reliability of the base station since the failure of a single RF unit will not result in service interruption of the whole sector. By the reliability estimation, the reliability of the RF units may be improved without increasing the hardware cost of the base station.

As can be appreciated by those skilled in the art, the RF unit may be a Remote Radio Unit (RRU). Generally, the RRU is located on a tower or other places not convenient for maintenance, and therefore, it increases requirements of the reliability. The RRU may be connected with the base band processing unit via a CPRI interface (of course, may also be other protocol interfaces) by way of cable or optical fiber, etc. The specific connection is similar with the aforementioned embodiment and thus is not repeatedly described here for brevity.

Figure 3:
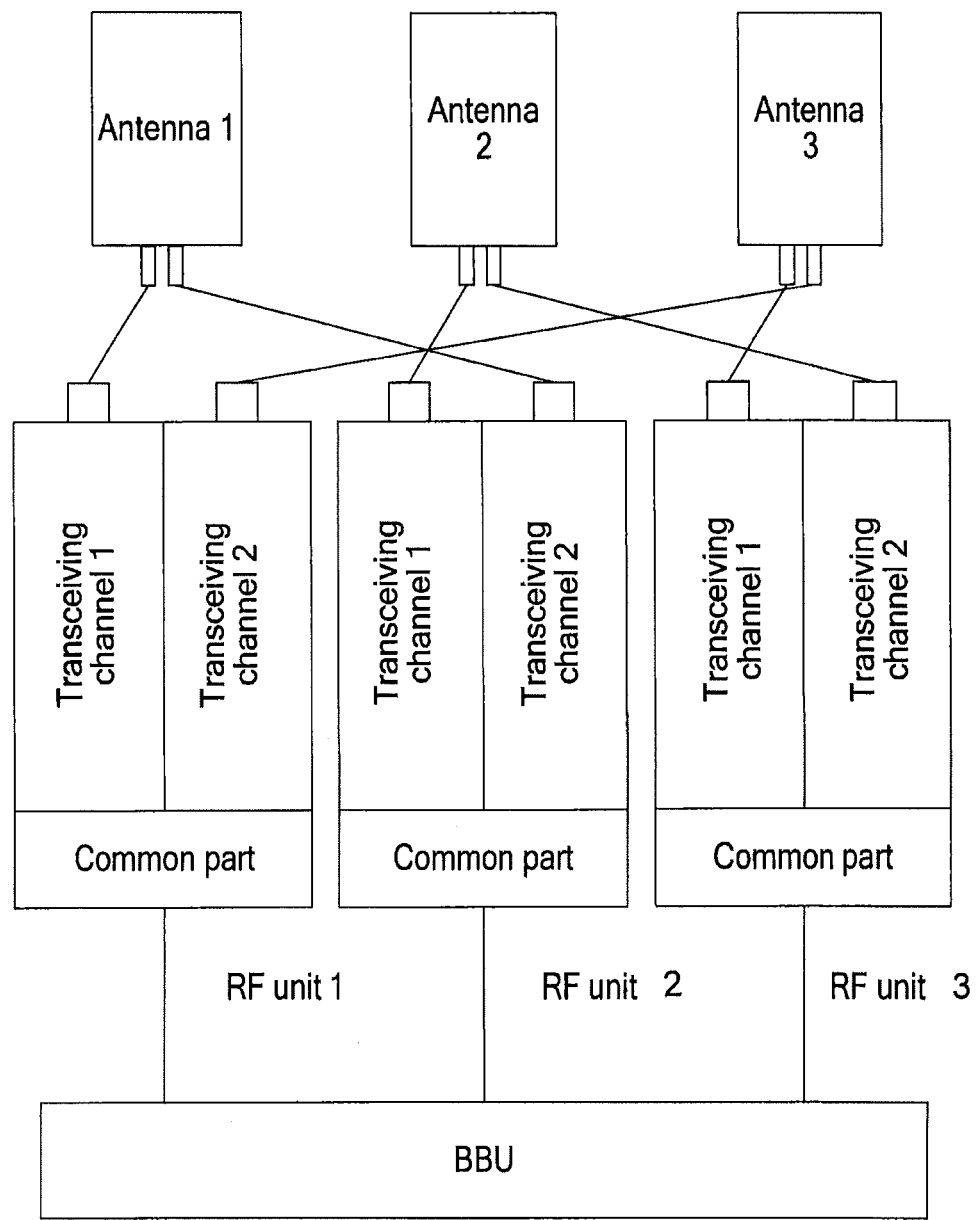
FIG. 3 is a schematic diagram of a communication system according to an embodiment of the present invention.

An embodiment of the present invention is illustrated by way of example where the system includes three antennas and three RF units. The schematic diagram of connections among the antennas and the RF units is shown in FIG. 3. FIG. 3 is a schematic diagram of a communication system according to an embodiment of the present invention. Two feeder lines of antenna 1 are connected with the transceiving channel 1 of RF unit 1 and the transceiving channel 2 of RF unit 2, respectively. Two feeder lines of antenna 2 are connected with the transceiving channel 1 of RF unit 2 and the transceiving channel 2 of RF unit 3, respectively. Two feeder lines of antenna 3 are connected with the transceiving channel 1 of RF unit 3 and the transceiving channel 2 of RF unit 1, respectively.

Figure 4:
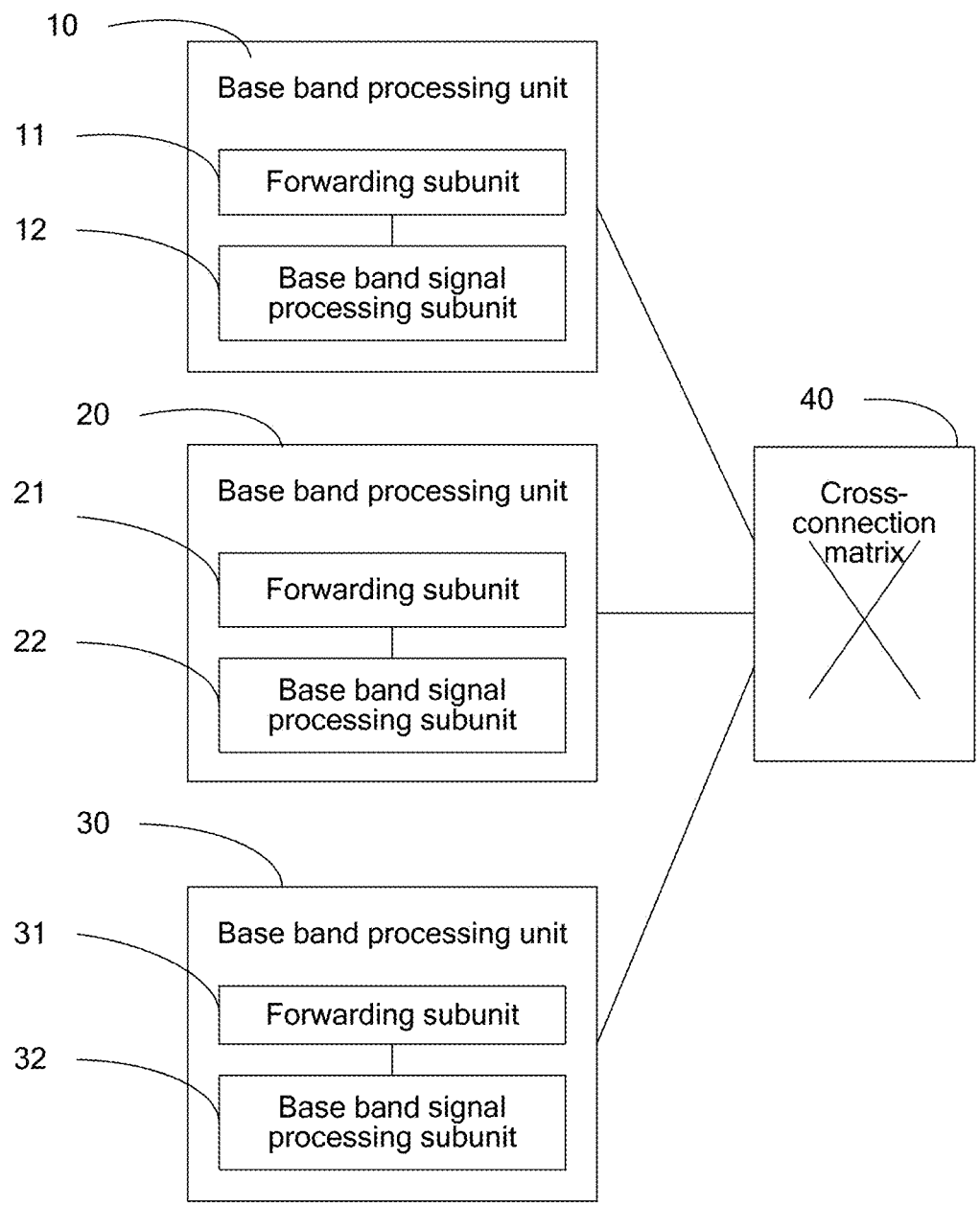
FIG. 4 is a schematic structural diagram of a BBU according to an embodiment of the present invention.

In this scenario, the BBU may be configured as shown in FIG. 4. FIG. 4 is a schematic diagram of BBU according to an embodiment of the present invention. The BBU includes three base band processing units, i.e., a base band processing unit 10, a base band processing unit 20, and a base band processing unit 30. The base band processing unit 10 further includes a forwarding subunit 11 and a base band signal processing subunit 12. The base band processing unit 20 further includes a forwarding subunit 21 and a base band signal processing subunit 22. The base band processing unit 30 further includes a forwarding subunit 31 and a base band signal processing subunit 32. The BBU may also include a cross-connection matrix 40, which is connected with each of the base band processing units and is configured to mutually transmit interaction signals among the base band processing units.

Specifically, the cross-connection matrix 40 may be deployed within a base band plane, or on a backplane, or on other physical entities. Also, the cross-connection matrix 40 may forward service data for different sectors between the base band processing units.

An embodiment is illustrated by taking an example that the base band processing unit 10 processes signals of sector 1, the base band processing unit 20 processes signals of sector 2, and the base band processing unit 30 processes signals of sector 3.

With respect to the base band processing unit 10, the forwarding subunit 11 is configured to: in the uplink receiving direction (from user terminal to base station), aggregate a signal of the sector 1 received by the RF unit 1 from a feeder line of the antenna 1, and a signal of the sector 1 received by the RF unit 2 from a feeder line of the antenna 1, and send the aggregated signals to the base band signal processing subunit 12. In the downlink transmitting direction (from base station to user terminal), the forwarding subunit 11 is configured to send base band data of the sector 1, where the base band data of the sector 1 is processed by the base band signal processing subunit 12, to the RF unit 1 and the RF unit 2, respectively. Next, the signals are sent to the sector 1 via the feeder lines, which connect the antenna 1 with the RF unit 1 and the RF unit 2.

Specifically, the forwarding subunit 11 may be configured to: in the uplink receiving direction (from user terminal to base station), aggregate the signals of the sector 1 which are received from different RF units, and then send the aggregated signals to the base band signal processing subunit 12 for processing; and forward a signal of a sector, where the signal of the sector needs to be processed by another base band processing unit, to a corresponding base band processing unit via the cross-connection matrix 40. For example, the signal of the sector 3 received by the RF unit 1 from the feeder line of the antenna 3 is forwarded via the cross-connection matrix 40 to the band signal processing unit 30 for processing the signals of the sector 3. Meanwhile, the signal of the sector 1 forwarded from another forwarding subunit (e.g., the forwarding subunit 21), and the signal of the sector 1 received from the feeder line of the antenna 1 are aggregated (or referred to as "combined") and then sent to the base band signal processing subunit 12 for processing. In a downlink transmitting direction, the forwarding subunit 11 splits the base band data of the sector 1 according to the policy of "same sector, different antennas", where the base band data of the sector 1 is processed by the base band signal processing subunit 12, and forwards the signals to the RF unit 1 and the RF unit 2 via the cross-connection matrix 40 respectively. Next, the signals are sent to the sector 1 via the feeder lines, which connect the antenna 1 with the RF unit 1 and the RF unit 2.

With respect to the base band processing unit 10, the base band signal processing subunit 12 is configured to: process the signals of the sector 1 sent from the forwarding subunit 11, and obtain and send processed base band data of the sector 1 to the forwarding subunit 11.

With respect to the base band processing unit 20, the forwarding subunit 21 is configured to: in the uplink receiving direction, aggregate a signal of the sector 2 received by the RF unit 2 from a feeder line of the antenna 2 and a signal of the sector 2 received by the RF unit 3 from a feeder line of the antenna 2, and send the aggregated signals to the base band signal processing subunit 22. In a downlink transmitting direction, the forwarding subunit 21 is configured to send the base band data of the sector 2, where the base band data of the sector 2 is processed by the base band signal processing subunit 22, to the RF unit 2 and the RF unit 3, respectively. Next, the signals are sent to the sector 2 via the feeder lines, which connect the antenna 2 with the RF unit 2 and the RF unit 3.

With respect to the base band processing unit 20, the base band signal processing subunit 22 is configured to: process the signals of the sector 2 sent from the forwarding subunit 21, and obtain and send the processed base band data of the sector 2 to the forwarding subunit 21.

With respect to the base band processing unit 30, the forwarding subunit 31 is configured to: in the uplink receiving direction, aggregate a signal of the sector 3 received by the RF unit 1 from a feeder line of the antenna 1 and a signal of the sector 3 received by the RF unit 3 from a feeder line of the antenna 3, and send the aggregated signals to the base band signal processing subunit 32. In a downlink transmitting direction, the forwarding subunit 31 is configured to send the base band data of the sector 3, where the base band data of the sector 3 is processed by the base band signal processing subunit 32, to the RF unit 1 and the RF unit 3, respectively. Next, the signals are sent to the sector 3 via the feeder lines, which connect the antenna 3 with the RF unit 1 and the RF unit 3.

With respect to the base band processing unit 30, the base band signal processing subunit 32 is configured to: process the signals of the sector 3 sent from the forwarding subunit 31, and obtain and send the processed base band data of the sector 3 to the forwarding subunit 31.

In the foregoing embodiments, a forwarding subunit is provided within each base band processing unit. In other words, the forwarding function is configured within each base band processing unit in a distributed way. In addition to the distributed configuration, centralized configuration of the forwarding function may also be adopted.

With respect to the centralized configuration, a forwarding unit and at least two base band processing units are configured. The forwarding unit is configured to: in an uplink receiving direction, aggregate the signals of a same sector which are received from different RF units, and transfer the aggregated signals to a same base band signal processing unit for processing; in a downlink transmitting direction, send base band data of the same sector, where the base band data of the same sector is processed by the base band processing unit, to the corresponding RF units, respectively. Each base band processing unit is configured to process the received signals of the same sector, and send the processed base band data of the same sector to the forwarding unit. The centralized configuration of the forwarding function is similar to the above-mentioned distributed configuration in the sense of signal processing.

Specifically, the forwarding unit is configured to: in the uplink receiving direction, aggregate the signals of a same sector which are received from different RF units, and forward the aggregated signals via a cross-connection matrix to a same base band processing unit for processing. In the downlink transmitting direction, the forwarding unit splits the base band data of the same sector according to the policy of "same sector, different antenna", where the base band data of the same sector is processed by the base band processing unit, and forwards the signals via the cross-connection matrix to different RF units corresponding to the sector. The base band processing unit is configured to process the received signals of the same sector, and send the processed base band data of the same sector to the forwarding unit.

In addition, the connection between the antennas and RF units is not limited to the manner illustrated in FIG. 3. Other connection manners may also be adopted. For example, the two feeder lines of the antenna 1 are connected with the transceiving channel 1 of the RF unit 2 and the transceiving channel 1 of the RF unit 3, respectively; the two feeder lines of the antenna 2 are connected with the transceiving channel 1 of the RF unit 1 and the transceiving channel 2 of the RF unit 3, respectively; the two feeder lines of the antenna 3 are connected with the transceiving channel 2 of the RF unit 1 and the transceiving channel 2 of the RF unit 2, respectively. The principle of other connection manners is similar to the structures illustrated in FIG. 3 and FIG. 4, and thus is not repeatedly described here for brevity.

Figure 5A:
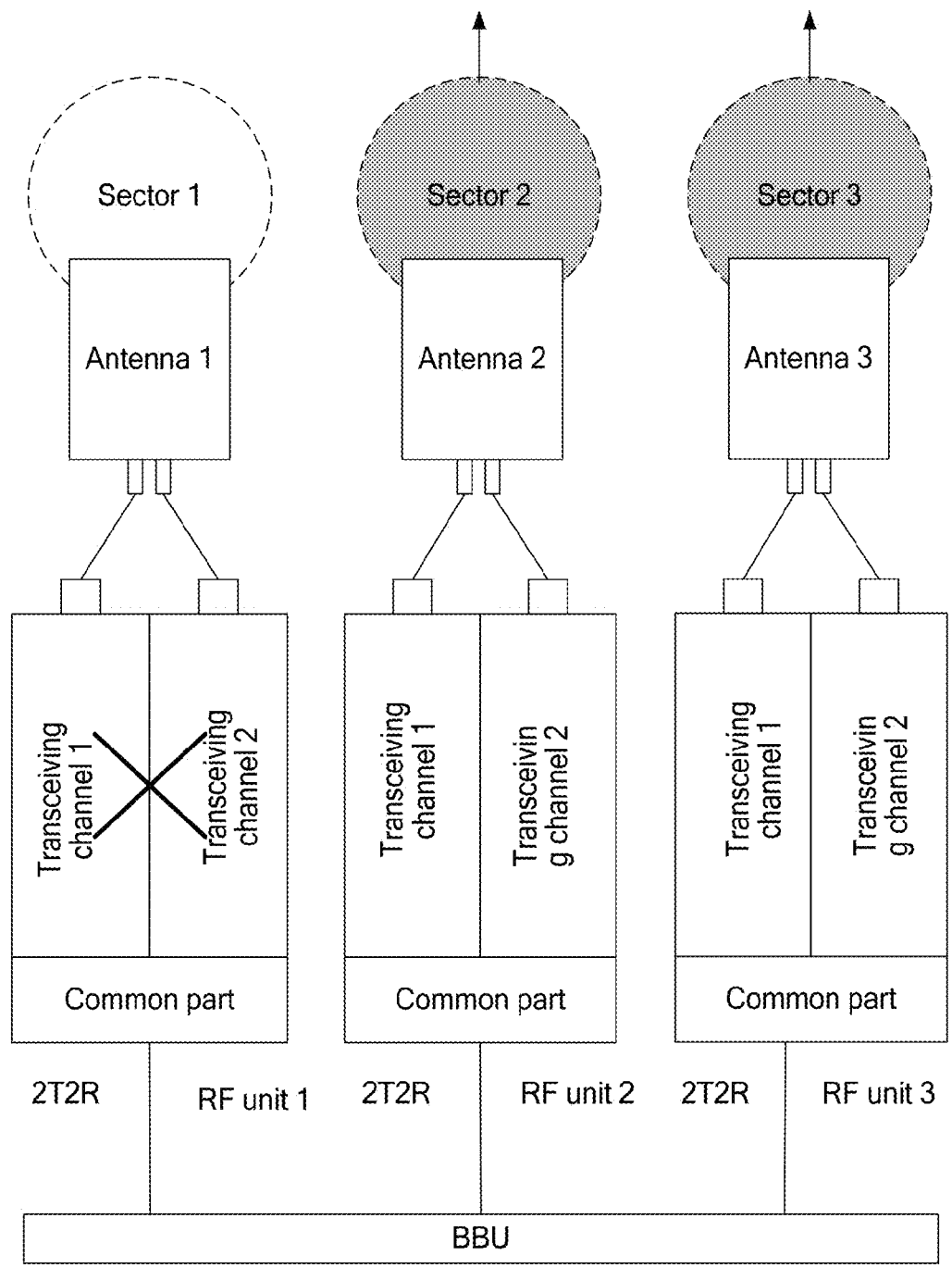
FIG. 5A is a schematic diagram where an RF unit of a communication system fails in the conventional art.
Figure 5B:
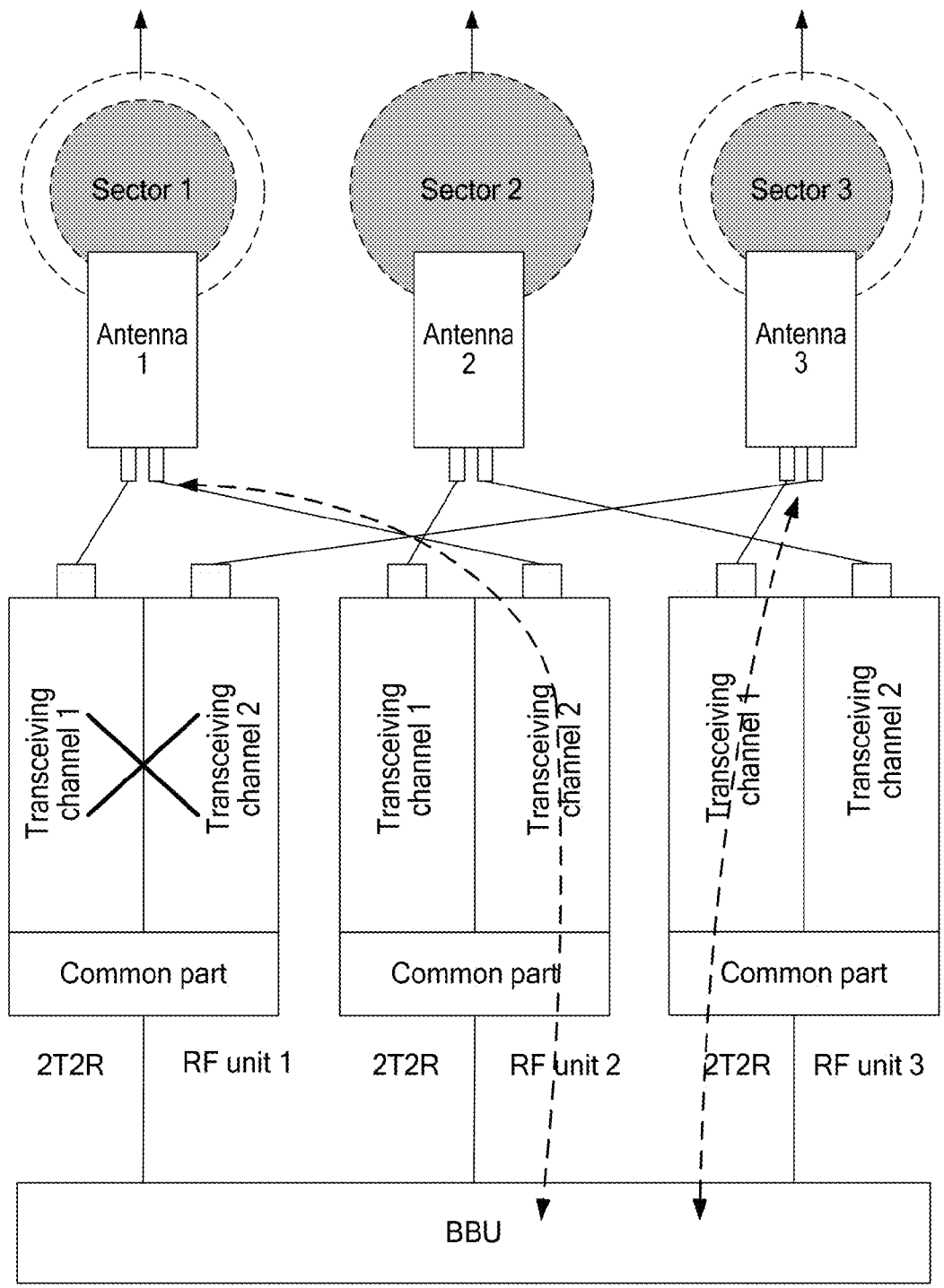
FIG. 5B is a schematic diagram where an RF unit of a communication system fails according to an embodiment of the present invention.

A schematic diagram of the communication system according to the conventional art is illustrated in FIG. 5A. FIG. 5A is a schematic diagram where an RF unit of the communication system fails in the conventional art. In the system, when the RF unit 1 fails, the service of the sector 1 is entirely interrupted. According to an embodiment of the present invention, a schematic diagram of a communication system is illustrated in FIG. 5B. FIG. 5B is a schematic diagram where an RF unit of the communication system fails according to an embodiment of the present invention. The feeder lines of the antenna 1 are connected with the RF unit 1 and the RF unit 2, respectively. The feeder lines of the antenna 2 are connected with the RF unit 2 and the RF unit 3, respectively. The feeder lines of the antenna 3 are connected with the RF unit 3 and the RF unit 1, respectively. When the RF unit 1 fails, since another feeder line for the sector 1 is connected with the RF unit 2, data may still be transceived by the RF unit 2. The change is that the performance of the sector 1 slightly decreases from original two transmitting and two receiving (2T2R) to one transmitting and one receiving (1T1R). On the other hand, the performance of the sector 3 may also decreases since the transceiving channel pair of the RF unit 1 is also used for the sector 3. Therefore, with the embodiment according to the present invention, when the RF unit 1 fails, although the coverage areas of both the sector 1 and the sector 3 become smaller, the service in the RF unit 2 will not be interrupted.

Figure 6:
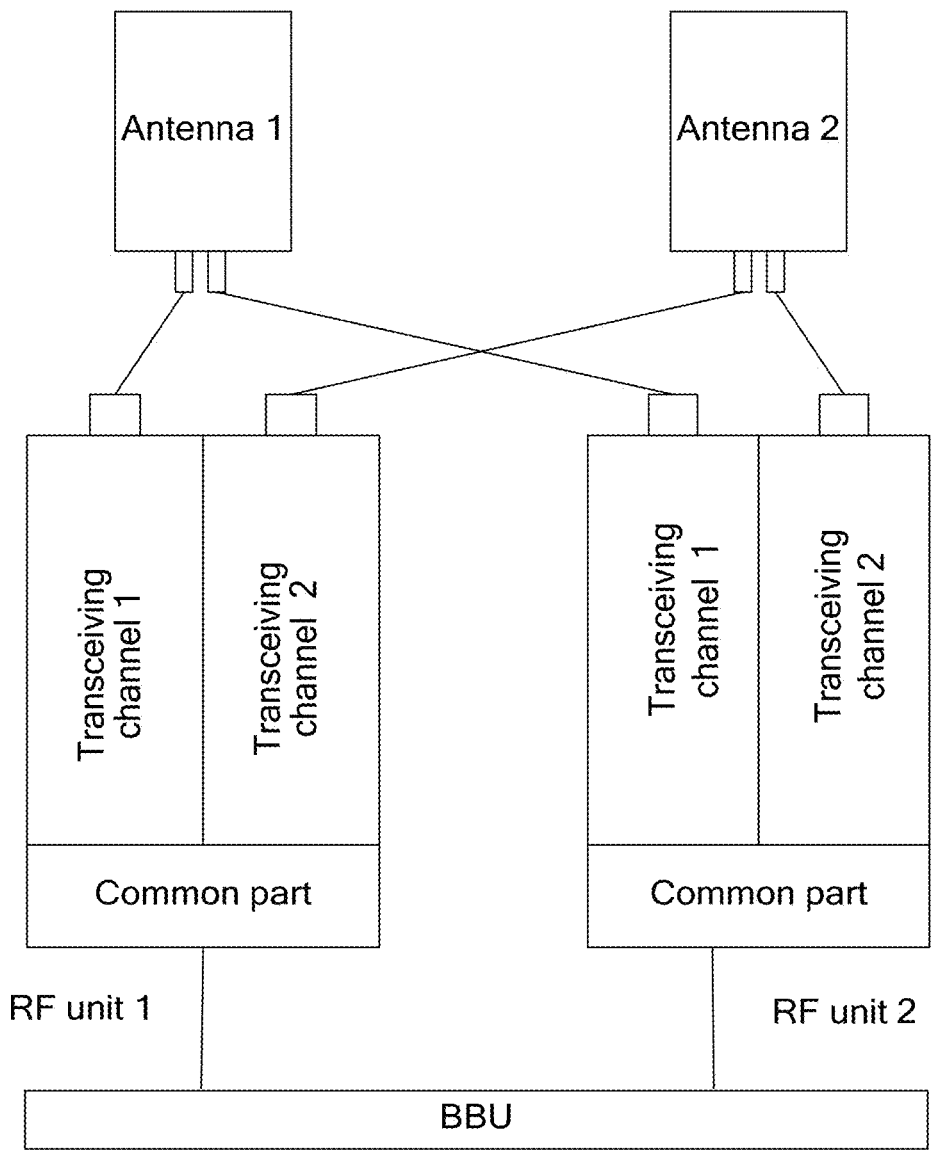
FIG. 6 is a schematic structural diagram of a communication system according to another embodiment of the present invention.

In the above-mentioned embodiments of the present invention, the detailed implementations are illustrated by taking an example that the system includes three antennas and three RF units. In another embodiment of the present invention, a system structure is illustrated in FIG. 6 where the system includes two antennas and two RF units. FIG. 6 is a schematic diagram of a communication system according to another embodiment of the present invention. The feeder lines of the antenna 1 are connected with the RF unit 1 and the RF unit 2, respectively. The feeder lines of the antenna 2 are connected with the RF unit 1 and the RF unit 2, respectively. With such a structure, in the uplink receiving direction, the BBU aggregates the signals sent by the RF unit 1 and the RF unit 2 receiving from a sector via the antenna 1, and transfers the aggregated signals to a same base band signal processing unit for processing; aggregates the signals sent by the RF unit 1 and the RF unit 2 receiving from a sector via the antenna 2 and transfers the aggregated signals to a same base band signal processing unit for processing. In the downlink transmitting direction, the BBU distributes the processed base band data of a same sector to the corresponding RF units which then send the signals to the corresponding sector via cross-connected feeder lines. The detailed implementation of the communication method for such a structure is similar to that illustrated in FIG. 3 and FIG. 4, and thus is not repeatedly described here for brevity.

In addition, in a scenario where an antenna has more than two feeder lines and/or each RF unit has more than two transceiving channels, the connection manner and detailed implementation of the embodiment of the present invention are similar to those illustrated in FIG. 3 and FIG. 4, and thus are not repeatedly described here for brevity.

As can be appreciated by those skilled in the art, the RF unit may be a Remote Radio Unit (RRU). Generally, the RRU is located on a tower or other places not convenient for maintenance, and therefore, increased requirements may be set for the reliability. The RRU may be connected with the base band processing unit via a CPRI interface (of course, may also be other protocol interfaces) by way of cable or optical fiber, etc. The specific connection manner is similar to that in the aforementioned embodiment and thus is not repeatedly described here for brevity.

A communication method is also provided according to an embodiment of the present invention. The communication method is applicable in a system which includes: a base band unit (BBU), at least two antennas and at least two radio-frequency (RF) units, where the at least two RF units are connected with the BBU respectively, and two feeder lines of each antenna are connected with transceiving channels of two different RF units respectively. The communication method includes the following steps.

(1) The BBU receives signals from different antennas, where the signal received from a same sector by an antenna is sent to the BBU respectively via different RF units.

(2) The BBU processes the signals. The processing of the signals includes: aggregating and then processing the signals of the same sector which are received from different RF units; and obtaining and sending the base band data of the same sector to the corresponding RF units respectively.

The detailed steps and procedures of the method embodiment of the present invention may be understood with reference to the description of the system embodiments and the apparatus embodiments of the present invention, and thus are not repeatedly described here for brevity.

According to the embodiments of the present invention, by cross-connections of the channels of the RF units with the feeder lines of the antennas, the service data for a single sector is distributively processed via the channels of different RF units by virtue of the independence of at least two transceiving channels. This may improve the reliability of the base station since the failure of a single RF unit may not result in service interruption of the whole sector. By the reliability estimation, the reliability of the RF units may be improved without increasing the hardware cost of the base station.

As can be appreciated by those skilled in the art, the RF unit may be a Remote Radio Unit (RRU). Generally, the RRU is located on a tower or other places not convenient for maintenance, and therefore, increased requirements may be set for the reliability. The RRU may be connected with the base band processing unit via a CPRI interface (of course, may also be other protocol interfaces) by way of cable or optical fiber, etc. The specific connection manner is similar to that in the aforementioned embodiment and thus is not repeatedly described here for brevity.

With the description of the foregoing embodiments, it is readily appreciated by those skilled in the art that the present invention may be implemented with hardware, or may be implemented with software on a necessary general-purpose hardware platform. Based on this understanding, solutions provided by the present invention may be embodied in a software product. The software product may be stored in a nonvolatile storage media (may be a CD-ROM, a USB flash disc, a removable hard disc, etc.) The software product may include a set of instructions enabling a computer device (may be a personal computer, a server, or a network device, etc.) to perform methods according to various embodiment of the present invention.

The foregoing disclosure is only a few embodiments of the present invention. However, the present invention is not intended to be limited to those embodiments. Any modification conceived from the present invention by those skilled in the art shall be construed as falling within the protection scope of the present invention.

The invention claimed is:

1. A communication system, comprising: a base band unit (BBU), at least two antennas, and at least two radio-frequency (RF) units, wherein
  the at least two RF units are connected with the BBU; and
  each antenna of the at least two antennas is connected with at least two RF units, so that a signal received from a same sector by the antenna is sent to the BBU via at least two RF units.

2. The communication system of claim 1, wherein each of the at least two antennas comprises at least two feeder lines, each of the at least two RF units comprises at least two transceiving channels, the at least two feeder lines are cross-connected with the transceiving channels of different RF units.

3. The communication system of claim 1, wherein the BBU comprises at least two base band processing units, each of which is configured to process signals of a same sector received from at least two RF units.

4. The communication system of claim 3, wherein each of the base band processing units comprises a forwarding subunit and a base band signal processing subunit, and the communication system further comprises a cross-connection matrix, wherein the cross-connection matrix is connected with the at least two base band processing units and is configured to interchange signals between the at least two base band processing units, wherein the forwarding subunit is configured to:

in an uplink receiving direction, aggregate signals of a same sector received from at least two RF units, and then forward the signals aggregated by the forwarding subunit to the base band signal processing subunit for processing; and forward to another base band processing unit via the cross-connection matrix a signal of a sector to be processed by the another base band processing unit;

in a downlink transmitting direction, forward base band data of the same sector processed by the base band signal processing subunit to at least two RF units corresponding to the sector via the cross-connection matrix.

5. The communication system of claim 3, wherein the BBU further comprises a forwarding unit, and the forwarding unit is configured to:

in an uplink receiving direction, aggregate signals of a same sector received from at least two RF units, and forward the signals aggregated by the forwarding unit to a same base band processing unit for processing;

in a downlink transmitting direction, forward base band data of the same sector processed by the base band processing unit to at least two RF units corresponding to the sector.

6. The communication system of claim 1, wherein the RF unit is a Remote Radio Unit (RRU).

7. A communication method, wherein, the communication method is applicable in a system comprising a base band unites (BBU), at least two antennas, and at least two radio-frequency (RF) units, wherein the at least two RF units are connected with the BBU, and each of the at least two antennas is connected with at least two RF units, and the communication method comprises:

receiving, by the BBU, signals from at least two antennas, wherein a signal received from a same sector by each of the antennas is sent to the BBU via at least two RF units; and processing, by the BBU, the signals.

8. The communication method of claim 7, wherein the BBU comprises at least two base band processing units, wherein each of the at least two base band processing units comprises a forwarding subunit and a base band signal processing subunit; and the processing, by the BBU, the signals comprises:

aggregating, by the forwarding subunit, in an uplink receiving direction, signals of a same sector received from different RF units, and sending the signals aggregated by the forwarding subunit to the base band signal processing subunit for processing; and forwarding a signal of another sector to be processed by another base band processing unit to the another base band processing unit via a cross-connection matrix.

9. The communication method of claim 8, wherein the method further comprises:

forwarding, by the forwarding subunit, in a downlink transmitting direction, base band data of the same sector processed by the base band signal processing subunit, to at least two RF units corresponding to the sector via the cross-connection matrix.

10. The communication system of claim 7, wherein the BBU comprises at least two base band processing units, and the BBU further comprises a forwarding unit; and the processing, by the BBU, the signals comprises:

aggregating, by the forwarding unit, in an uplink receiving direction, signals of a same sector received from different RF units, and forwarding the signals aggregated by the forwarding unit to a same base band processing unit for processing.

11. The communication method of claim 10, wherein the method further comprises:

forwarding, by the forwarding unit, in a downlink transmitting direction, base band data of the same sector processed by the base band processing unit, to at least two RF units corresponding to the sector.

* * * * *

UNITED STATES PATENT AND TRADEMARK OFFICE
CERTIFICATE OF CORRECTION

| | |
|---|---|
| PATENT NO. | : 9,225,410 B2 |
| APPLICATION NO. | : 14/300760 |
| DATED | : December 29, 2015 |
| INVENTOR(S) | : He et al. |

It is certified that error appears in the above-identified patent and that said Letters Patent is hereby corrected as shown below:

In the Claims:

Claim 7, Column 9, Line 33:

Delete "unites" and insert --unit--, therefor.

Signed and Sealed this
Seventeenth Day of May, 2016

Michelle K. Lee
*Director of the United States Patent and Trademark Office*